Patented May 2, 1950

2,506,540

UNITED STATES PATENT OFFICE 2,506,540

VANILLIN PURIFICATION BY DISTILLATION

Collis C. Bryan, Seattle, Wash., assignor to Monsanto Chemical Company, St. Louis, Mo., a corporation of Delaware No Drawing. Application May 29, 1948, Serial No. 30,182

15 Claims. (Cl. 202—42)

This invention relates to an improved distillation process for recovering vanillin from crude concentrates obtained in the manufacture of synthetic vanillin from various source materials, particularly lignin. More particularly, this invention relates to a vacuum distillation process for treating such concentrates whereby substantially 100% of the vanillin content of such concentrates may be directly recovered by a single treatment in a very pure form and the cost and difficulty of subsequent refining to meet the U. S. P. standard is thereby greatly reduced by effective rejection during the distillation of colored, flavored, and other impurities which hitherto have been exceedingly difficult to remove.

The nature and scope of the invention will be clarified by consideration of the methods followed by the prior art.

By one method, the crude vanillin (herein, the crude concentrates obtained in the manufacture of synthetic vanillin from various source materials are also referred to as crude vanillin) along with impurities is first dissolved in a water-immiscible organic solvent and then extracted with sodium bisulfite solution which selectively converts the vanillin (an aldehyde) to a sodium bisulfite-aldehyde addition compound which is soluble in water and insoluble in the organic medium. This step is followed by acidifying with sulfuric acid, heating and blowing to remove $SO_2$, followed by re-extraction with an organic solvent. The organic solvent is then distilled off and the vanillin residue vacuum-distilled to remove small residues of impurities. Owing to the high purity which can be obtained at this stage, the distillation can be carried out at a relatively low temperature which minimizes distillation losses. The product can then be crystallized to produce the final, highly purified product. The objection to this process lies in the cost for time, apparatus, and reagents of the numerous steps involved.

A second method is direct distillation of the crude followed by purification by several steps of crystallization. This has the advantage of low cost for processing and apparatus but is subject to a serious disadvantage due to high losses which occur in the distillation.

A third method involves several steps of fractional crystallization from an organic solvent followed by low temperature distillation and final recrystallization. This process involves the disadvantage that a considerable proportion of the vanillin will remain in the residues from the initial crystallization steps and the recovery of this portion of vanillin necessitates a relatively high temperature distillation procedure with attendant serious losses of the vanillin.

It will be seen from the foregoing that the presently available methods for recovering pure vanillin from the original crude product involve two types of difficulties. On the one hand, present high temperature distillation procedures entail serious vanillin losses, apparently principally due to degradation, decomposition, and condensation with impurities. On the other hand, known methods for recovering a high percentage of the vanillin content involve serious costs due to their complexity and consumption of reagents.

These difficulties appear to be tied up with the nature of the impurities from which the vanillin must be separated and especially the fact that there appears to be a mutual solubility between the impurities and vanillin which greatly complicates the separation. This mutual solubility is indicated by the fact that the crude concentrates either exist as or form homogeneous, clear but colored solutions, free from suspended matter or indications of phase separation.

The main cause for the high losses in the prior distillation processes appears to be the heat-sensitivity of the vanillin. While such distillations are normally carried out under vacuum, it is necessary, when dealing with the original crude vanillin, to reach a relatively high distilling temperature and vanillin is very readily decomposed by excessive heat, particularly if the duration of exposure to high temperature is extended. Experience has shown that, where a distillation process is used in the purification of crude vanillin, effective removal of the component vanillin (by component vanillin is meant the vanillin content of the original crude vanillin) from the impurities normally requires the use of temperatures well above 140° C. where degradation of the vanillin begins. As the temperature and time of exposure increase, losses increase and apparently degradation is very rapid above about 165° C.

An object of this present invention is to provide a process for the purification of vanillin wherein the losses incurred by the practice of the prior art are substantially eliminated. A further object of this invention is to provide a process whereby substantially 100% of the component vanillin can be recovered from crude vanillin. Another object is to provide a process wherein substantially pure vanillin may be separated from the great bulk of the impurities contained in crude vanillin in a single processing step. Another object is to distill crude vanillin without causing heat or other objectionable changes, which can be loosely classed as degradation, by a simple distillation process and yet operate at a high enough temperature so as to avoid the expense of an excessively high vacuum and thus, in a single treatment, obtain a purified vanillin which is sufficiently pure to be directly suitable for final crystallizations. Another object is to obtain commercially with low cost for purification a pure synthetic vanillin having an entirely satisfactory melting point, color, odor, and flavor as well as a product which meets U. S. P. specifications.

The unexpected discovery has now been made that, if the distillation of crude vanillin is carried out preferably under a moderate vacuum and in the presence of a non-reactive, substantially non-solvent, liquid distilling aid which is capable of distilling with the vanillin below a temperature which is injurious to vanillin, three outstanding advantages are provided. First, substantially all the vanillin can be distilled over at a low enough temperature so as to eliminate degradation. Second, there is the unexpected feature that almost all the impurities are left behind in the distilling flask although, if the crude is distilled alone without any distilling aid, objectionable amounts of impurities also come over in the vapors. Third, the vanillin can be readily separated from the distilling aid and purified for sale.

The present invention for the first time provides a method of recovering over 99% of component vanillin from a crude vanillin which is a vanillin concentrate contaminated with dissolved colored, flavored, and other impurities, simultaneously rejecting nearly all impurities and obtaining directly from the distillation a concentrate of a degree of purity adapted for the usual final crystallizations. The new distillation method preferably involves distilling the concentrate at a commercially feasible vacuum such as a pressure of 8 mm. of mercury absolute while continuously diluting the mixture during the distillation with a total of about one to six volumes of preferably a substantially aliphatic, liquid, non-reactive, saturated hydrocarbon having an initial boiling point, at atmospheric pressure, beginning at about 220° C. and a maximum or end boiling point, at atmospheric pressure not exceeding about 320° C. and preferably having a boiling range between about 270° C. and 300° C., and continuing the distillation until over 99% of the vanillin is removed as a mixed vapor consisting of vanillin and hydrocarbon distilling aid. Under these conditions, all but a very small portion of the impurities contained in the crude vanillin is left behind as a distillation residue and the vapors containing the component vanillin are condensed for further treatment.

The following examples illustrate the operation of the process of the present invention and illustrate the advantages to be gained in the practice of this invention over the methods of the prior art but are not to be construed as limitations since numerous variations will be readily apparent to those skilled in the art.

In all of the examples, distillation was carried out in a simple glass distillation vessel which alternately could have been of glass, nickel, steel, stainless steel, or the like. The vessel was provided with a source of vacuum so that the distillation could be conducted below a critical temperature which is about 165° C. (A vacuum, for example, having an absolute pressure in the range between about 2 and 15 mm. of mercury, may be used, although the vacuum employed is not critical and is governed by the critical temperature requirement and by economic conditions. The critical temperature requirement and the need for efficiency preclude operating at or near atmospheric pressure which is theoretically possible but actually impractical since an excessive amount of distillation aid would have to be processed without any apparent advantage.) The distillation vessel was also provided with a vertical packed column connected to a glass condenser. The packed column assisted in refluxing a portion of the volatile impurities back into the still pot. The column was jacketed and electrically heated to prevent undesirable cooling and refluxing effect interfering with the distillation of the vanillin. A mechanical stirrer was also supplied to prevent local over-heating in the still. The distilled product from the condenser was discharged into a separatory funnel for convenience in handling the distillate.

*Example I*

This example is inserted for comparative purposes as an illustration of a typical distillation procedure without making use of the novel features of the present invention.

A crude, colored but homogeneous liquid, which was a lignin vanillin concentrate containing approximately an 85% concentration of component vanillin (containing 133.2 grams of component vanillin as determined by analysis), was placed in the distilling vessel and distilled at approximately 2 mm. pressure by means of heat derived from an oil bath. The vanillin started distilling when the oil bath temperature reached about 145° C. and the discharged vapor at the top of the packed column was at least 125° C. As the distillation continued, the oil bath temperature was gradually increased until a final maximum of about 190° C. had been reached, giving a discharged vapor temperature of 127° C. Distillation was continued for about two hours until condensate containing vanillin ceased to come over. By control of the electrically heated element surrounding the packed column jacket during the distillation, the temperature of the column jacket was kept within two or three degrees of the temperature of the vapors at the head of the column. The object of this procedure was to keep the packed column from acting as a reflux condenser to any undesirable extent to prevent the passage of the bulk of the vanillin vapors into the final condenser. When at the end of the distillation it was found that vanillin vapors had ceased coming over, the packed column was intentionally heated to a sufficiently high temperature to volatilize and drive over into the condenser any accumulation of vanillin on the surfaces of the column packing. The distillate was found by analysis to contain 120.5 grams of vanillin, a recovery of 90.4% of the component vanillin. The purity of the vanillin as recovered at this stage was only about 94% as a large proportion of the impurities distilled over along with the vanillin. This unsatisfactory degree of purity was confirmed by a low melting point of 74.2° C. The removal of these residual impurities was difficult, requiring four solvent crystallizations and one water crystallization to bring up to U. S. P. grade.

It will be noted that, by this process, nearly 10% of the vanillin was lost during the distillation, presumably because of degradation and condensation due to the effect of the long exposure of the vanillin to relatively high temperature and to intimate contact under these conditions with reactive impurities. It is to be noted that, although this distillation was carried out at a high vacuum of 2 mm. of mercury, the distilling vapors were discharged at a temperature range from 125° C. to 127° C. It is also to be particularly noted that an injuriously high pot temperature ranging from 145° C. to 190° C. was required to effect the distillation.

It is believed that, under the conditions of a distillation of this character, vanillin begins to be degraded at least to a slight extent when a temperature of about 140° C. is exceeded and degradation becomes serious and rapid whenever a temperature of about 165° C. is exceeded. From the temperatures occurring in this distillation, it is apparent that at least a substantial portion of the vanillin last distilled was exposed to temperatures exceeding 165° C. and it appears probable and it is believed that this feature largely explains the approximate 10% loss of vanillin which occurs.

It is also emphasized that this distillation not only caused a substantial loss of vanillin but the vanillin that was produced was found to be of low purity.

*Example II*

As a distilling aid to be used in this example, a fraction was taken of a virgin gas oil, a commercial mixture of essentially saturated hydrocarbons made by the Phillips Petroleum Company. This fraction was prepared by distilling the oil to obtain a material boiling between 100° C. and 115° C. at 2 mm. pressure. The atmospheric boiling range of this fraction would be within the range of about 250° C. to 290° C. Owing to using in this example a procedure of simultaneously distilling an oil along with the vanillin, a slightly different manipulation was used in connection with the condenser. During the distillation period, water between about 90° C. and 100° C. was normally run through the condenser, this temperature being high enough to keep the condensing vanillin in the liquid state. However, as the distillation progressed, the condenser was occasionally cooled with cold water which gave an opportunity to ascertain if vanillin was still coming over. If it was, a rapid accumulation of white crystals appeared on the cooled walls of the condenser.

A batch of a similar crude lignin vanillin as was used in Example I containing approximately 85% of component vanillin (95.22 grams of vanillin as determined by analysis) was distilled with mechanical agitation at the same pressure as in Example I, namely, 2 mm. of mercury. During the distillation, a total of about five volumes of the above oil for each volume of crude vanillin was added continuously to the distilling flask. When the oil bath temperature reached about 110° C., distillation commenced, giving a vapor temperature of about 98° C. It was noted that both vanillin and oil distilled over together. Distillation was continued for about three hours until the pot temperature reached about 130° C. and the vapor temperature was about 114° C., when it was noted that no further vanillin came over in the distilled vapor. The distillate was discharged through the condenser into a separatory funnel and it was noted that a sharp phase separation occurred, giving a clear layer of oil above a melt of almost colorless vanillin. Upon cooling and separating, this oil was found to contain approximately one-fourth of one percent of vanillin at the separation temperature. In order to determine the full yield of vanillin in the foregoing distillation, this small fraction of vanillin was stripped from the oil by means of a sodium bisulfite extraction. The sum of the vanillin obtained directly and that stripped from the oil was 95.2 grams, which is substantially a 100% yield. (In commercial practice, it is not necessary to strip this small fraction from the oil, since the oil can be returned and used as it is for subsequent distillation and the vanillin content in the oil remains constant.) The subsequent purification of the vanillin to U. S. P. grade was readily carried out by the procedure described in Example III. The vanillin which was separated from the oil proved to have been exceedingly well freed from impurities during distillation.

Comparing this example including the use of a special oil as a distilling aid to Example I in which no oil was used, it is noted that, although both the starting material and the vacuum were equivalent in both cases, in Example I distillation occurred at pot temperatures ranging from 145° C. to 190° C. while in Example II, where the oil was used, the pot temperatures ranged only from 110° C. to 130° C. Likewise it was noted in Example I that the vapor temperature ranged from 125° C. to 127° C., while in Example II the vapor temperature ranged from 98° C. to 114° C. It is apparent that the use of the oil in the procedure of Example II made it possible to effect the distillation and remove all the vanillin at substantially lower temperature and it is believed that the lower distillation temperature is mainly responsible for the feature that Example II avoids the vanillin losses which occurred in Example I. The use of the oil also appears to have been responsible for the greatly improved purity of the product.

It is essential that the oil used as a distillation aid be capable of distilling over freely along with the vanillin. It might be thought that the dilution effect of an immiscible oil present in the distillation vessel in considerable amount and agitated during the distillation by the stirring mechanism might effectively protect the vanillin from degradation. This apparently is not the case because a check run made with an oil having a boiling point too high to permit simultaneous distillation did not produce any significant reduction in degradation losses or improvement in the purity of the recovered product.

*Example III*

As a distilling aid for use in this example, Shell mineral seal oil, a commercial mixture of saturated hydrocarbons, made by the Shell Oil Company, was distilled and a cut recovered boiling at atmospheric pressure within a temperature range of between 270° C. and 300° C.

A similar batch of 85% crude lignin vanillin, containing 84.44 grams of vanillin as determined by analysis, was distilled with agitation for 3.5 hours at between 7 and 8 mm. of mercury pressure while the above described oil was continuously added during the distillation at a rate such that, by the end of the distillation, approximately 3.5 volumes of oil had been introduced for each volume of the crude vanillin.

The distillation proceeded similarly to that described in Example II and, at the end of about 3.5 hours, vanillin ceased coming over in the vapor. The distillate was treated in the same manner as was described in Example II and it was found that there was a recovery of 83.94 grams of vanillin or a yield of 99.4%. The pot temperature range was 134° C. to 159° C. and the vapor temperature range was 120° C. to 142° C.

The vanillin recovered from this distillation was almost colorless and was readily purified by two chlorobenzene crystallizations followed by a single water crystallization. The chlorobenzene crystallizations were required mainly to remove traces of oil dissolved in the vanillin melt at the time of separation. Owing to the small amount of oily impurity to be removed, the chlorobenzene crystallization could be carried out by mixing the mass with about an equal weight of chlorobenzene. The chlorobenzene crystallization also served to remove acetovanillone which is recovered by this process in a very pure state amounting to 3.5% on the basis of the vanillin. This is a by-product of considerable value, not readily recoverable by the prior art processes. The water crystallization served to remove residues of chlorobenzene.

The resulting product fully met the current U. S. P. specification and additionally was of notably satisfactory character as to the vital features of color, odor, and flavor. Although the U. S. P. specification calls for only a melting point of between 81° C. and 83° C., the melting point of this product was between 82.3° C. and 83° C. which indicates its exceptional purity.

Example IV

The oil used as a distilling aid in this example was the same as in Example III. The crude vanillin, however, was obtained from guaiacol as a starting material, and is herein referred to as guaiacol vanillin. Except for the difference in starting material, the procedure was identical to that in Example III. The yield was substantially 100% vanillin and the almost colorless material obtained was purified with the same ease as the product of Example III.

It is particularly to be noted that the distillation temperature in Examples II, III and IV is much lower than in Example I and the large loss of vanillin indicated in Example I has been almost wholly avoided.

In addition, the vanillin obtained in Example I was very more much difficult to purify to U. S. P. grade. In contrast, the vanillin obtained in the other examples, where the oil was used as a distilling aid, was so pure that it was readily and economically brought to U. S. P. grade by usual procedures such as two organic solvent crystallizations and one water crystallization. The product of Example I, after four solvent crystallizations and one water crystallization, was not of desirable purity as indicated by slight off color and odor.

The distilling aid recovered from Examples II, III and IV was directly suitable for re-use.

Example V

The oily material used as a distilling aid in this example was diethyl phthalate, to illustrate the results obtained with a liquid distilling aid of aromatic character.

A batch of crude lignin vanillin, containing 245.9 grams of vanillin as determined by analysis, was distilled with mechanical agitation for 1.5 hours at about 4 mm. of mercury pressure. During the distillation, about 2.5 volumes of diethyl phthalate were added continuously to the distilling flask. During the distillation, the head or vapor temperature ranged between about 136° C. and 140° C. and the pot temperature ranged between about 153° C. and 161° C. Both the crude and the distilled vanillin were completely miscible with the diethyl phthalate when the temperature was above about 70° C. Analysis showed that the distillate obtained contained about 244.8 grams of vanillin or a yield of 99.5%. However, no attempt was made to convert the product to U. S. P. vanillin since the vanillin was largely in solution in the diethyl phthalate even at room temperature. This feature would materially increase the cost of removing the vanillin as compared to the simple cooling method available with the aliphatic hydrocarbon oils previously described.

The experiment indicated, however, that an aromatic compound having suitable physical constants can be used as a distilling aid in the process of the present invention although at some disadvantage. Diethyl phthalate at 5 mm. vacuum has a boiling point of 140.7° C. and, at atmospheric pressure, the boiling point is 294.6° C.

This experiment illustrates both the feasibility of and the objection to the use of predominantly aromatic compounds in the present process since they are excellent solvents for vanillin and consequently do not have the feature characteristic of the aforementioned aliphatic materials of providing an easy means for separating the vanillin from the distilling aid due to extremely low solubility, particularly at room temperature.

In view of the foregoing evidence, the character of a preferred distilling aid suitable for commercial use in the present process is seen to be as follows: it should be a refined oil and preferably a water-white oil composed of substantially saturated, aliphatic hydrocarbons. The desirability of a water-white material is, of course, to minimize any possibility of contaminating the vanillin with impurities. The saturated character is desirable to insure that the hydrocarbons present are non-reactive with vanillin. The aliphatic requirement is to provide the desirable feature that the oil be substantially a non-solvent for vanillin at room temperature, thus simplifying the separation of the vanillin from the oil. The boiling range at 2 mm. of mercury pressure should be between about 85° C. and 140° C. At a pressure of 15 mm. of mercury, the oil should preferably distill between about 140° C. and 165° C. This range, it will be noted, permits the oil to distill over freely under temperature and pressure conditions which also permit the vanillin to distill freely. Oils of this character are readily obtainable by a redistillation of a wide range of commercially available products, and materials meeting the foregoing specification are equally applicable to the process of the present invention. Distilling aids for the purposes of this invention may also be selected from the chlorinated derivatives of aliphatic hydrocarbons provided the chlorinated derivatives have distilling ranges within the above described limits. Examples of such chlorinated aliphatic hydrocarbon derivatives which may be used in the practice of this invention are myristyl chloride (monochlorotetradecane), monochloropentadecane and dichloroundecane. Such a chlorinated aliphatic hydrocarbon distilling aid may be prepared by chlorinating a light gas oil and distilling the chlorinated product to obtain a fraction having the described desired boiling range.

The rate at which the oil is added during the distillation process is not critical, apparently the only requirement being the presence of a sufficient amount of oil to always provide a considerable dilution of the vanillin vapors with the vapor distilled from the oil. Theoretically, the oil might all be added initially and no more added during the distillation but, in that case, unnecessarily large amounts are required to make sure that sufficient oil remains to provide the necessary oil vapor in the last stages of the distillation. Consequently, in commercial operation, it is more convenient to add the oil continuously as the distillation proceeds.

Experience with this method of distilling crude vanillin indicates that the procedure works equally well with all the commercially available crudes such as lignin vanillin which is vanillin derived from lignin or guaiacol vanillin which is vanillin synthesized from guaiacol regardless of the nature of their source material.

It is recognized that, if very large quantities of vanillin are to be purified, it might be advantageous to apply the principles of this invention to a distillation which is carried on continuously rather than batchwise in a suitably modified distilling arrangement, that is: where the crude vanillin and the distilling aid are continuously supplied to the still and the product and still-bottoms continuously removed.

I claim:

1. In a process for the recovery of vanillin in high yield and purity from a crude concentrate, containing vanillin contaminated with colored, flavored, and other impurities, the steps comprising simultaneously distilling the crude vanillin concentrate and a liquid aliphatic distilling aid which is non-reactive with vanillin and substantially a non-solvent for vanillin at room temperature, said aliphatic distilling aid being selected from the group consisting of aliphatic hydrocarbons and chloro-aliphatic hydrocarbons and having a boiling range wherein the aliphatic distilling aid simultaneously distils with the vanillin at a temperature which does not exceed the temperature that causes degradation of the vanillin, and continuing the distillation until substantially all of the vanillin is removed in the mixed vapor, then separating the vanillin from said aliphatic distilling aid.

2. The method of claim 1 in which the distillation is carried out under vacuum.

3. The method of claim 1 in which the distillation is carried out under vacuum of between about 2 mm. and 15 mm. of mercury pressure and the distilling temperature does not exceed about 165° C.

4. In a process for the recovery of vanillin in high yield and purity from a crude concentrate, containing vanillin contaminated with colored, flavored, and other impurities, the steps comprising simultaneously vacuum-distilling the crude vanillin concentrate and a liquid aliphatic hydrocarbon distilling aid which is substantially saturated, said hydrocarbon boiling within an atmospheric boiling range between about 220° C. and 320° C. and carrying out said simultaneous distillation under reduced pressure at a temperature not exceeding about 165° C., continuing said distillation while removing the vanillin in a mixed distillate of vanillin and said hydrocarbon distilling aid.

5. In the process of claim 4, wherein the distillation is carried out under a reduced pressure of between about 2 mm. and 15 mm. of mercury absolute and the distillation temperature does not exceed about 165° C.

6. In the process of claim 4 wherein the aliphatic hydrocarbon distilling aid boils within an atmospheric boiling range between about 270° C. and 300° C.

7. In the process of claim 4 wherein the aliphatic hydrocarbon distilling aid is an aliphatic hydrocarbon oil boiling within an atmospheric boiling range between about 220° C. and 320° C.

8. In the process of claim 4 wherein the aliphatic distilling aid is a chlorinated hydrocarbon oil.

9. The method of claim 4 in which the distilling aid has an atmospheric boiling range of between about 270° C. and 300° C. and the distillation is carried out under a vacuum between approximately 7 mm. and 8 mm. of mercury pressure at pot temperature in the range between about 130° C. and 160° C. and vapor temperatures in the range between about 120° C. and 145° C.

10. The method of claim 4 in which a crude liquid concentrate of lignin vanillin is purified.

11. The method of claim 4 in which a crude liquid concentrate of guaiacol vanillin is purified.

12. The method of recovering vanillin in high yield and purity from a crude concentrate, containing vanillin contaminated with colored, flavored, and other impurities, which comprises the steps of simultaneously vacuum-distilling the crude vanillin concentrate and a liquid substantially aliphatic saturated hydrocarbon distilling aid which is a non-solvent for vanillin at room temperature, said hydrocarbon having an atmospheric boiling range between about 220° C. and 320° C. and distilling under reduced pressure at a temperature not exceeding about 165° C., continuing said distillation until substantially all the vanillin is removed in a mixed distillate of vanillin and said hydrocarbon distilling aid, then cooling the distillate of vanillin and distilling aid until the distilling aid and the vanillin separate as two superimposed liquid phases, then removing the distilling aid from the molten vanillin and purifying the vanillin to U. S. P. grade.

13. In a process for the recovery of vanillin in high yield and purity from a crude concentrate, containing vanillin contaminated with colored, flavored and other impurities, the steps comprising vacuum-distilling the crude vanillin concentrate while continuously diluting said concentrate during the entire distillation with between one and six volumes of a liquid substantially aliphatic hydrocarbon distilling aid which is non-reactive with vanillin and substantially a non-solvent for vanillin at room temperature, said distilling aid having a boiling range wherein the aliphatic hydrocarbon distilling aid simultaneously distils with the vanillin at a temperature which does not exceed the temperature which causes degradation of the vanillin, and continuing the distillation while the vanillin is removed in a mixed vapor of vanillin and said distilling aid, then separating the vanillin from said distilling aid.

14. The method of claim 13 in which the distilling temperature does not exceed about 165° C.

15. The method of claim 13 in which the distilling aid is a liquid substantially aliphatic saturated hydrocarbon boiling within the boiling range of between about 220° C. and 320° C.

COLLIS C. BRYAN.

REFERENCES CITED

The following references are of record in the file of this patent:

UNITED STATES PATENTS

| Number | Name | Date |
| --- | --- | --- |
| 2,187,366 | Schutz | Jan. 16, 1940 |
| 2,245,945 | Van Dijck et al. | June 17, 1941 |
| 2,265,939 | Field | Dec. 9, 1941 |